United States Patent
Miyazaki et al.

(10) Patent No.: US 10,410,173 B2
(45) Date of Patent: Sep. 10, 2019

(54) BICYCLE COMPONENT OPERATING DEVICE

(71) Applicant: Shimano Inc., Sakai, Osaka (JP)

(72) Inventors: Kentaro Miyazaki, Osaka (JP); Kazutaka Fukao, Osaka (JP)

(73) Assignee: Shimano Inc., Osaka (JP)

( * ) Notice: Subject to any disclaimer, the term of this patent is extended or adjusted under 35 U.S.C. 154(b) by 249 days.

(21) Appl. No.: 15/477,704

(22) Filed: Apr. 3, 2017

(65) Prior Publication Data
US 2018/0285807 A1 Oct. 4, 2018

(51) Int. Cl.
*B62K 23/06* (2006.01)
*G06Q 10/08* (2012.01)
*B62M 25/04* (2006.01)
*B62K 23/02* (2006.01)
*B62J 1/08* (2006.01)

(52) U.S. Cl.
CPC ........... *G06Q 10/087* (2013.01); *B62K 23/02* (2013.01); *B62K 23/06* (2013.01); *B62M 25/04* (2013.01); *B62J 2001/085* (2013.01)

(58) Field of Classification Search
CPC ........... B62K 23/02; B62K 23/06; B62L 3/00; B62M 25/04; B62J 2001/085
See application file for complete search history.

(56) References Cited

U.S. PATENT DOCUMENTS

| 4,100,820 A * | 7/1978 | Evett ...................... | B62K 23/06 192/217 |
| 4,974,469 A * | 12/1990 | Romano ................ | B62K 23/06 74/489 |
| 2009/0025504 A1* | 1/2009 | Dal Pra' ................. | B62K 23/06 74/501.6 |
| 2010/0139442 A1* | 6/2010 | Tsumiyama ............ | B60T 7/102 74/502.2 |
| 2015/0096400 A1* | 4/2015 | Miki ...................... | B62K 23/02 74/488 |
| 2015/0291249 A1 | 10/2015 | Fukao et al. | |
| 2015/0307154 A1* | 10/2015 | Miki ........................ | B62L 3/00 74/491 |
| 2016/0059925 A1 | 3/2016 | Miki et al. | |
| 2016/0297501 A1 | 10/2016 | Fukao et al. | |
| 2018/0285807 A1* | 10/2018 | Miyazaki ............. | G06Q 10/087 |

* cited by examiner

*Primary Examiner* — Vicky A Johnson
(74) *Attorney, Agent, or Firm* — Global IP Counselors, LLP

(57) ABSTRACT

A bicycle component operating device is basically provided with a first base member, a first operating member, a second base member and a second operating member. The first operating member is pivotally mounted to the first base member to pivot about a first axis to control a first bicycle component. The second base member is different from the first base member. The second base member is separably attached to the first base member along an axial direction parallel to the first axis. The second operating member is pivotally mounted to the second base member to control a second bicycle component that is different from the first bicycle component. The first operating member remains with the first base member and the second operating member remains with the second base member upon separation of the first base member from the second base member.

21 Claims, 11 Drawing Sheets

BICYCLE COMPONENT OPERATING DEVICE

BACKGROUND

Field of the Invention

This invention generally relates to a bicycle component operating device. More specifically, the present invention relates to a bicycle component operating device that can be configured to selectively operate one or two bicycle component operating devices.

Background Information

Bicycles are often provided with one or more bicycle components that can be operated and/or adjusted by a rider while riding. Examples of some these bicycle components include a gear changing device (e.g., a derailleur or an internally geared hub), a suspension and a seatpost. A bicycle component operating device is usually provided on a bicycle (e.g., on a bicycle handlebar) for a rider to operate and/or adjust these bicycle components. The bicycle component operating device is often connected to the bicycle component with, for example, a Bowden-type control cable.

SUMMARY

Generally, the present disclosure is directed to various features of a bicycle component operating device. One aspect disclosed in the present disclosure is to provide a bicycle component operating device that can be configured to selectively operate one or two bicycle component operating devices.

In view of the state of the known technology and in accordance with a first aspect of the present disclosure, a bicycle component operating device is provided that basically comprises a first base member, a first operating member, a second base member and a second operating member. The first operating member is pivotally mounted to the first base member to pivot about a first axis to control a first bicycle component. The second base member is different from the first base member. The second base member is separably attached to the first base member along an axial direction parallel to the first axis. The second operating member is pivotally mounted to the second base member to control a second bicycle component that is different from the first bicycle component. The first operating member remains with the first base member and the second operating member remains with the second base member upon separation of the first base member from the second base member.

Advantageously according to the first aspect of the present invention, a user can easily configure the bicycle component operating device between three different user control modes: (1) two bicycle component control mode; or (2) a first bicycle component control mode; or (3) a second bicycle component control mode.

In accordance with a second aspect of the present invention, a bicycle component operating device is provided that basically comprises a first actuation unit and a second actuation unit. The first actuation unit includes a first base member and a first rotatable member rotatably mounted to the first base member about a first axis to control a first bicycle component. The second actuation unit includes a second base member and a second rotatable member rotatably mounted to the second base member about a second axis to control a second bicycle component that is different from the first bicycle component. The second base member is different from the first base member. The second base member is separably attached to the first base member along an axial direction parallel to the first axis. The first rotatable member remains with the first base member and the second rotatable member remains with the second base member upon separation of the first base member from the second base member.

Advantageously according to the second aspect of the present invention, a user can easily configure the bicycle component operating device between three different user configurations: (1) the first and second actuation units integrated as a unit with a single mounting member; or (2) only the first actuation unit with the mounting member; or (3) only the second actuation unit with the mounting member.

In accordance with a third aspect of the present invention, a bicycle component operating device is provided that basically comprises a mounting member, a first base member, a first operating member, a fixing member, a second base member and a second operating member. The mounting member is configured to be mounted to a bicycle handlebar. The first operating member is mounted to the first base member to control a first bicycle component. The fixing member is configured to fix the first base member to the mounting member. The fixing member has an axial direction. The second base member is different from the first base member. The second base member is separably attached to the first base member opposite to the mounting member along the axial direction. The second operating member is mounted to the second base member to control a second bicycle component that is different from the first bicycle component. The first operating member remains with the first base member and the second operating member remains with the second base member upon separation of the first base member from the second base member.

Advantageously according to the third aspect of the present invention, a user can easily configure the bicycle component operating device between three different user control modes: (1) two bicycle component control mode; or (2) a first bicycle component control mode; or (3) a second bicycle component control mode.

In accordance with a fourth aspect of the present invention, the bicycle component operating device according to any one of the first to third aspects is configured so that the second operating member is arranged to pivot about a second axis. The first axis and the second axis are coaxially arranged with respect to each other.

Advantageously according to the fourth aspect of the present invention, the bicycle component operating device can be easily operated by a user.

In accordance with a fifth aspect of the present invention, the bicycle component operating device according to any one of the first to fourth aspects further comprises a fixing member fixing the first base member to the second base member.

Advantageously according to the fifth aspect of the present invention, the first base member can be easily attached to the second base member with the fixing member.

In accordance with a sixth aspect of the present invention, the bicycle component operating device according to the fifth aspect is configured so that the first base member includes a first hole. The second base member includes a second hole. The fixing member is disposed in the first hole and the second hole.

Advantageously according to the sixth aspect of the present invention, the first base member and the second base member can easily accommodate the fixing member.

In accordance with a seventh aspect of the present invention, the bicycle component operating device according to the sixth aspect is configured so that the first hole and the second hole are positioned along the first axis.

Advantageously according to the seventh aspect of the present invention, the bicycle component operating device can be relatively compact.

In accordance with an eighth aspect of the present invention, the bicycle component operating device according to the sixth aspect is configured so that the fixing member includes a shaft having a first threaded portion, and the second hole has a second threaded portion that is threadedly engaged with the first threaded portion.

Advantageously according to the eighth aspect of the present invention, the first base member can be easily attached to and detached from the second base member with a threaded fastener as the fixing member.

In accordance with a ninth aspect of the present invention, the bicycle component operating device according to the eighth aspect is configured so that the shaft has a first end portion and a second end portion. The first threaded portion is disposed along the second end portion. The fixing member includes a head disposed on the first end portion. The first base member is positioned between the head of the fixing member and the second base member.

Advantageously according to the ninth aspect of the present invention, base member can be securely attached to the second base member.

In accordance with a tenth aspect of the present invention, the bicycle component operating device according to the ninth aspect is configured so that the first hole is a non-threaded hole.

Advantageously according to the tenth aspect of the present invention, the fixing member can be easily inserted through the first hole of the first base member and attached to the second base member.

In accordance with an eleventh aspect of the present invention, the bicycle component operating device according to the fifth aspect further comprises a mounting member configured to be mounted to a bicycle handlebar. The fixing member fixes the first base member to the mounting member.

Advantageously according to the eleventh aspect of the present invention, the bicycle component operating device can be conveniently located for the user to operate.

In accordance with a twelfth aspect of the present invention, the bicycle component operating device according to the eleventh aspect is configured so that the mounting member includes a third hole, and the fixing member is disposed in the third hole.

Advantageously according to the twelfth aspect of the present invention, the bicycle component operating device can be manufactured at a lower cost by using the same fixing member to attach both the second base member and the mounting member the first base member.

In accordance with a thirteenth aspect of the present invention, the bicycle component operating device according to any one of the fifth to twelfth aspects further comprises an additional fixing member fixing the first base member to the mounting member. The additional fixing member is different from the fixing member.

Advantageously according to the thirteenth aspect of the present invention, the mounting member can be more securely fastened to the first base member.

In accordance with a fourteenth aspect of the present invention, the bicycle component operating device according to the thirteenth aspect is configured so that the first base member includes a fourth hole that is different from the first hole. The second base member includes a fifth hole that is different from the second hole. The mounting member includes a sixth hole that is different from the third hole. The additional fixing member is disposed in each of the fourth hole, the fifth hole and the sixth hole.

Advantageously according to the fourteenth aspect of the present invention, the mounting member will be prevented from rotating relative to the first and second base members.

In accordance with a fifteenth aspect of the present invention, the bicycle component operating device according to the fourteenth aspect is configured so that the additional fixing member includes a shaft. The shaft has a third threaded portion. The sixth hole has a fourth threaded portion that is threadedly engaged with the third threaded portion.

Advantageously according to the fifteenth aspect of the present invention, the additional fixing member can be easily attached to and detached from the mounting member.

In accordance with a sixteenth aspect of the present invention, the bicycle component operating device according to any one of the first to fifteenth aspects further comprises a positioning ratchet that is pivotally mounted with respect to the second base member about the second axis.

Advantageously according to the sixteenth aspect of the present invention, the bicycle component operating device can be used to control a bicycle component that has at least two predetermined positions.

In accordance with a seventeenth aspect of the present invention, the bicycle component operating device according to any one of the first to sixteenth aspects is configured so that the first base member is free of a positioning ratchet.

Advantageously according to the seventeenth aspect of the present invention, the bicycle component operating device can be used to control a bicycle component that is controlled by merely pulling a control element such as control cable.

In accordance with an eighteenth aspect of the present invention, the bicycle component operating device according to any one of the first to seventeenth aspects is configured so that the first operating member is configured to operate an adjustable seatpost as the first bicycle component, and the second operating member is configured to operate one of a shift device and a suspension as the second bicycle component.

Advantageously according to the eighteenth aspect of the present invention, the bicycle component operating device can be used to easily control both an adjustable seatpost and one of a shift device and a suspension.

In accordance with a nineteenth aspect of the present invention, a bicycle component operating device is provided that basically comprises a mounting member, a, first actuation unit and a second actuation unit. The mounting member is configured to be mounted to a bicycle handlebar. The first actuation unit comprises a first base member and a first operating member. The first operating member is pivotally mounted to the first base member about a first axis to control a first bicycle component. The first base member includes a first attachment surface and a second attachment surface that is positioned at an opposite side from the first attachment surface with respect to an axial direction that is parallel to the first axis. The first attachment surface is configured to be attached to the mounting member. The second actuation unit comprises a second base member and a second operating member. The second base member is different from the first base member. The second base member is configured to be separably attached to the first base member along the axial direction. The second operating member is pivotally mounted to the second base member to control a second bicycle component. The second bicycle component is different from the first bicycle component. The second base member includes a third attachment surface that is configured to be attached to the second attachment surface. The second attachment surface has a first surface profile. The third attachment surface has a second surface profile. The first surface profile and the second surface profile are configured such that the first base member and the second base member are supported on each other in a state where the first base member and the second base member are attached to each other along the axial direction. The first operating member remains with the first base member and the second operating member remains with the second base member upon separation of the first base member from the second base member.

Advantageously according to the nineteenth aspect of the present invention, a user can easily configure the bicycle component operating device between three different user configurations: (1) the first and second actuation units integrated as a unit with a single mounting member; or (2) only the first actuation unit with the mounting member; or (3) only the second actuation unit with the mounting member.

In accordance with a twentieth aspect of the present invention, the bicycle component operating device according to the nineteenth aspect further comprises one of a first fixing member and a second fixing member. The first fixing member is configured to fix the first actuation unit and the second actuation unit to the mounting member in a state where the first base member and the second base member are attached to each other along the axial direction. The second fixing member is configured to fix one of the first actuation unit and the second actuation unit to the mounting member in a state where only the one of the first base member and the second base member is attached to the mounting member.

Advantageously according to the twentieth aspect of the present invention, the bicycle component operating device can be provided with an attractive appearance in each of the three different user configurations.

In accordance with a twenty-first aspect of the present invention, the bicycle component operating device according to the twentieth aspect is configured so that the second fixing member is configured to fix the second actuation unit to the mounting member in a state where the second base member is attached to the mounting member. The second fixing member is shorter than the first fixing member.

Advantageously according to the twenty-first aspect of the present invention, the second fixing member will not protrude from the one of the first base member and the second base member that is attached to the mounting member.

Also other objects, features, aspects and advantages of the disclosed bicycle component operating device will become apparent to those skilled in the art from the following detailed description, which, taken in conjunction with the annexed drawings, discloses one embodiment of the bicycle component operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Referring initially to FIGS. 1 to 4, a bicycle component operating device 10 is illustrated in accordance with a first embodiment. Here, the bicycle component operating device 10 is configured to be mounted to a left side of a handlebar H so as to be operated by rider's left hand. In the illustrated embodiment, the bicycle component operating device 10 is configured to be operatively coupled to a first bicycle component BC1 via a first control cable 12, and operatively coupled to a second bicycle component BC1 via a second control cable 14. In the illustrated embodiment, the second bicycle component BC2 is different from the first bicycle component BC1.

Figure 1:
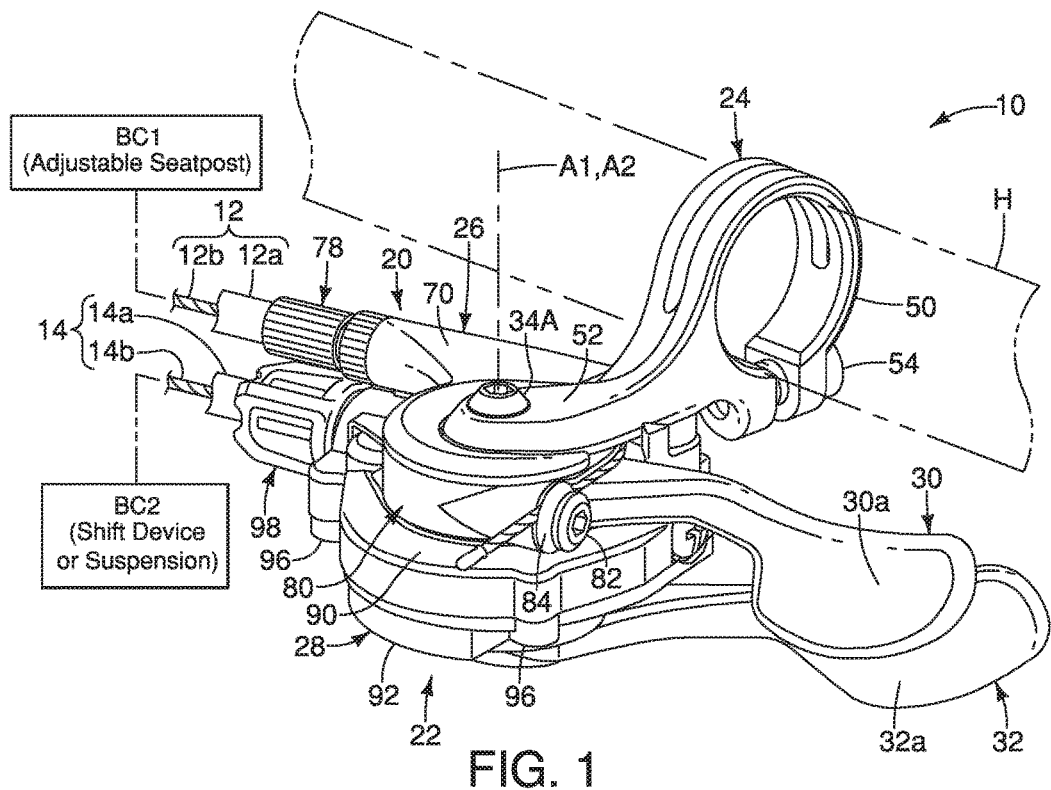
FIG. 1 is a top perspective view of a bicycle component operating device including a first actuation unit and a second actuation unit in accordance with one illustrated embodiment.
Figure 2:
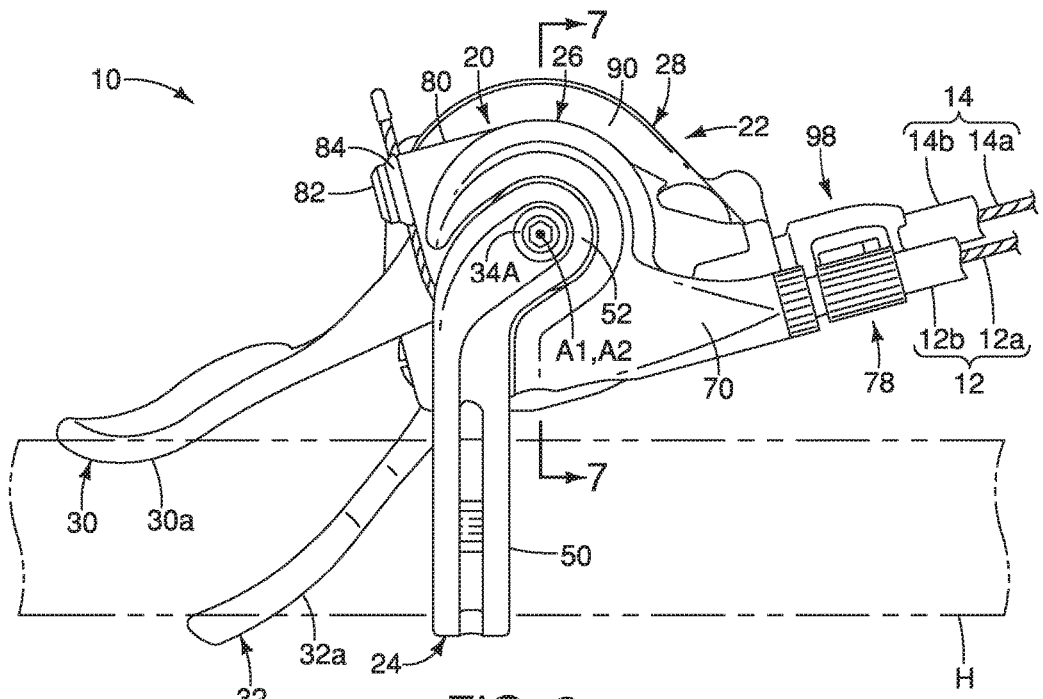
FIG. 2 is a top plan view of the bicycle component operating device illustrated in FIG. 1 with a first operating (lever) member of the first actuation unit in a rest position and a second operating (lever) member of the second actuation unit in a rest position.
Figure 3:
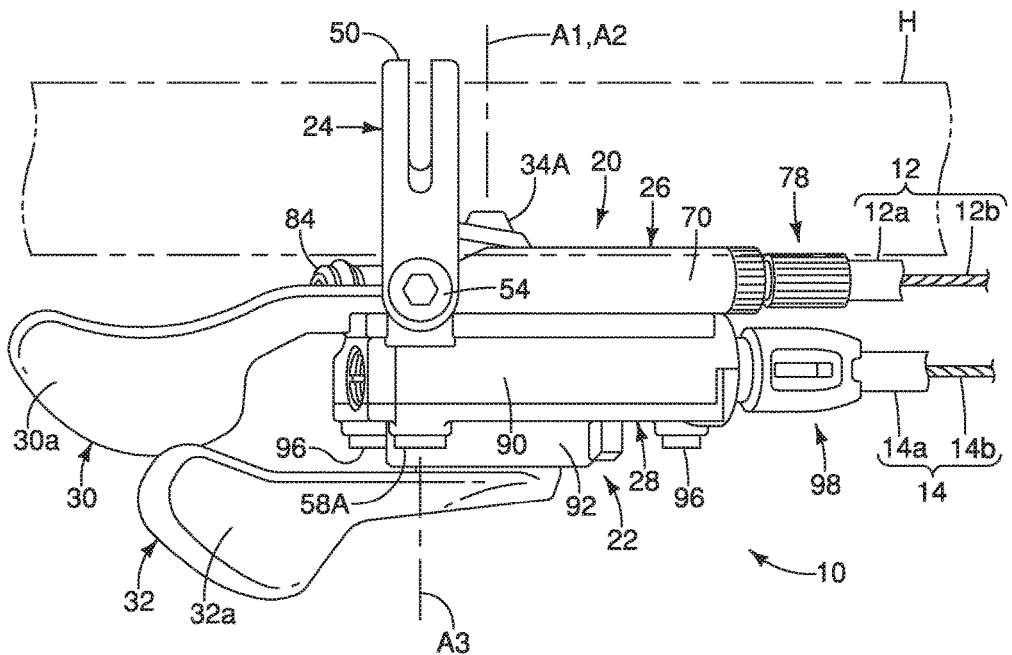
FIG. 3 is a side elevational view of the bicycle component operating device illustrated in FIGS. 1 and 2 with the first and second operating members in the rest positions.
Figure 4:
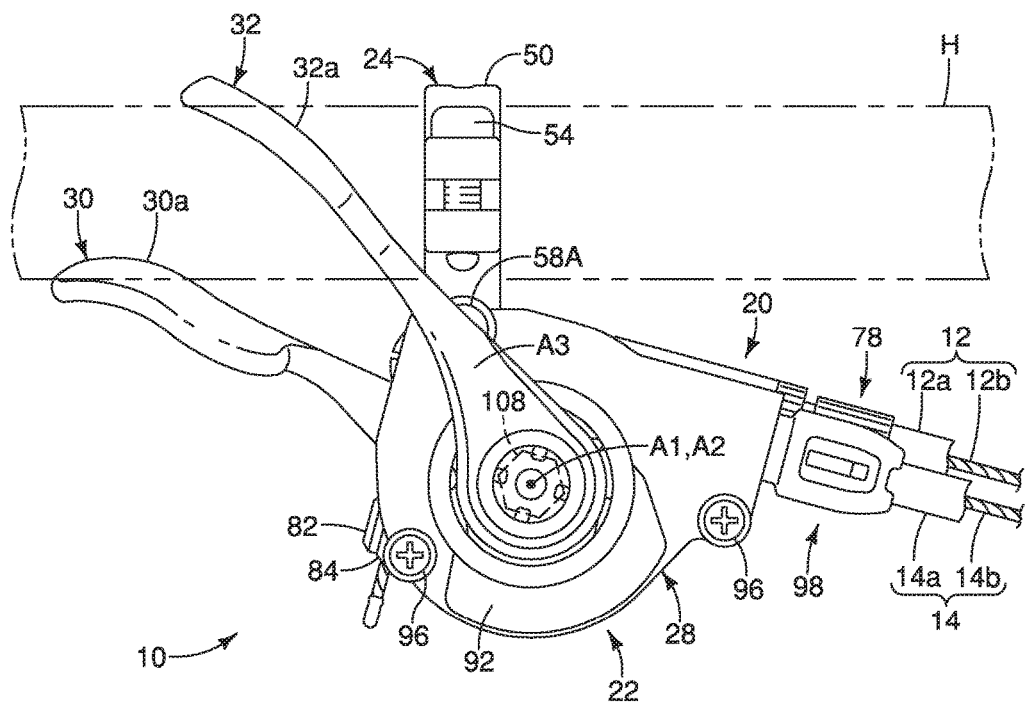
FIG. 4 is a bottom plan view of the bicycle component operating device illustrated in FIGS. 1 to 3 with the first and second operating members in the rest positions.
Figure 5:
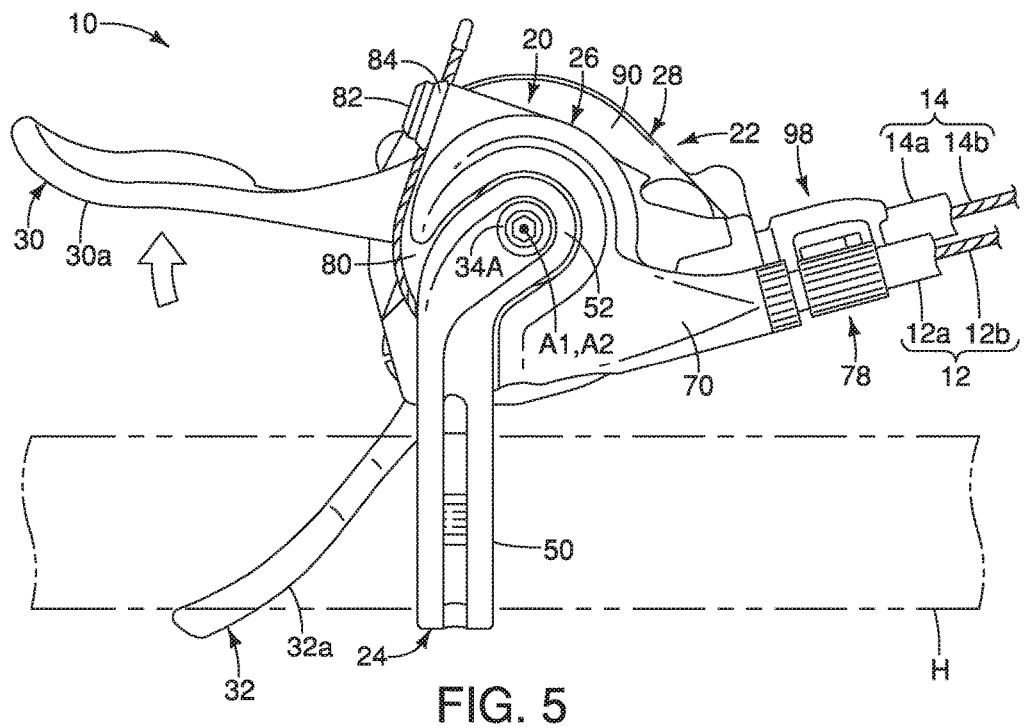
FIG. 5 is a top plan view of the bicycle component operating device illustrated in FIGS. 1 to 4, but with the first operating member moved to an operated position and the second operating member in the rest position.

Preferably, as seen in FIG. 1, the first and second control cables 12 and 14 are conventional bicycle operating cables. The first control cable 12 has an outer case 12a covering an inner wire 14b. Similarly, the second control cable 14 has an outer case 14a covering an inner wire 14b. In other words, the first and second control cables 12 and 14 are Bowden type cables. Thus, the inner wire 14b is slidably received within the outer case 12a, and the inner wire 14b is slidably received within the outer case 14a.

Figure 10:
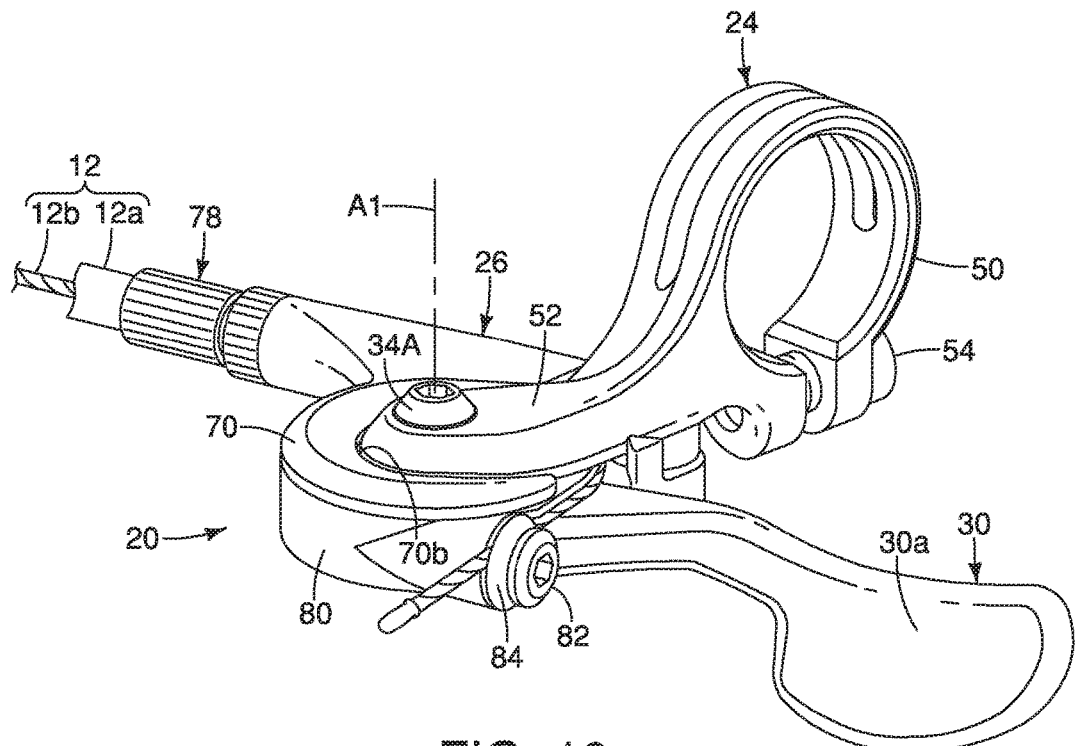
FIG. 10 is a top perspective view of the first actuation unit illustrated in FIGS. 1 to 9 attached to the mounting member to form a separate independent bicycle component operating device including only the first actuation unit.
Figure 11:
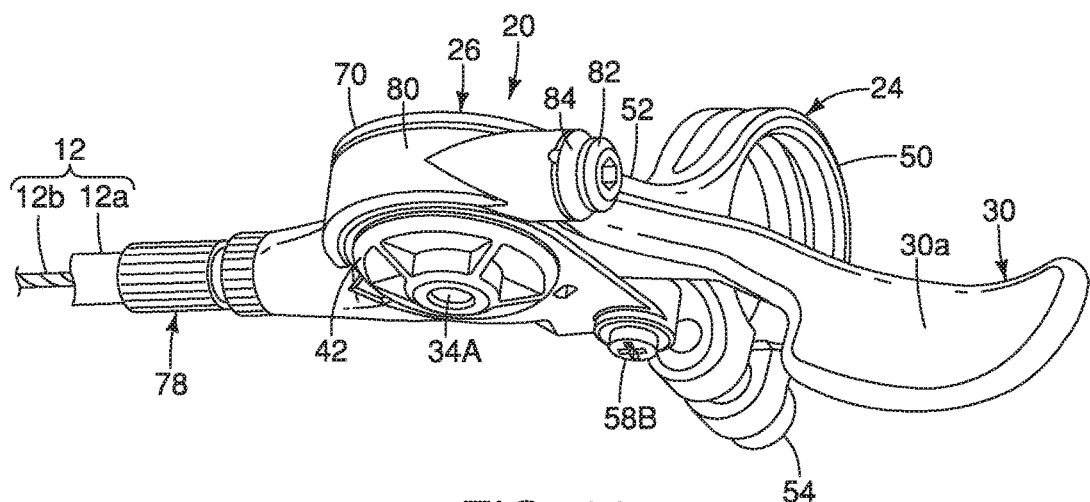
FIG. 11 is a bottom perspective view of the first actuation unit illustrated in FIG. 10 attached to the mounting member to form the bicycle component operating device including only the first actuation unit.
Figure 13:
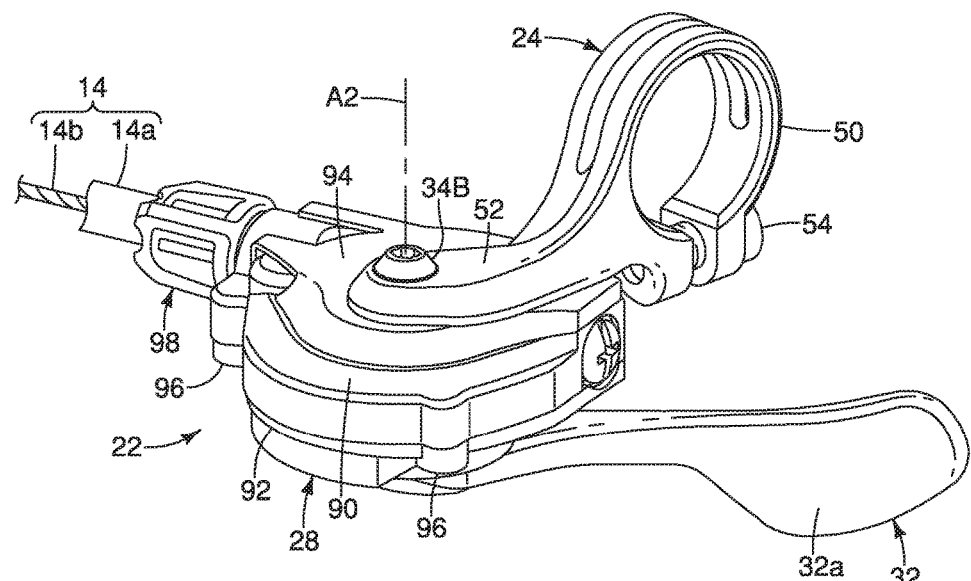
FIG. 13 is a top perspective view of the second actuation unit illustrated in FIGS. 1 to 9 attached to the mounting member to form a separate independent bicycle component operating device including only the second actuation unit.
Figure 14:
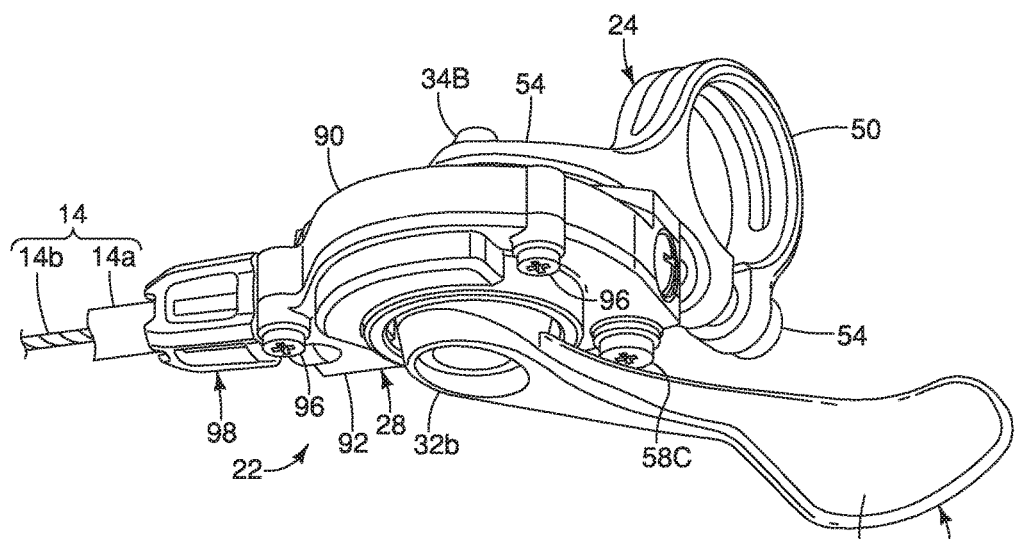
FIG. 14 is a bottom perspective view of the second actuation unit illustrated in FIG. 13 attached to the mounting member to form the bicycle component operating device including only the second actuation unit.

The bicycle component operating device 10 basically comprises a first actuation unit 20 and a second actuation unit 22. The bicycle component operating device 10 further comprises a mounting member 24 that is configured to be mounted to the bicycle handlebar H. The first actuation unit 20 operates the first bicycle component BC1 by selectively pulling the inner wire 14b. The second actuation unit 22 operates the first bicycle component BC2 by selectively pulling or releasing the inner wire 14b. With the bicycle component operating device 10, a user can chose between: (1) using both the first and second actuation units 20 and 22 as an integrated unit with the mounting member 24 (i.e. a single mounting member) as seen in FIG. 1 to 7; or (2) using only the first actuation unit 20 with the mounting member 24 as seen in FIGS. 10 and 11; or (3) using only the second actuation unit 22 with the mounting member 24 as seen in FIGS. 13 and 14. As explained below, the bicycle component operating device 10 can be provided as a kit that allows to a user to converter the bicycle component operating device 10 between the three different modes of use.

In the illustrated embodiment, the first actuation unit 20 is configured as bicycle control device that can be used as a seatpost control device for adjusting the height of an adjustable seatpost (i.e., the bicycle component BC1). However, the first actuation unit 20 can be configured as a bicycle control device for controlling other types of bicycle components as needed and/or desired. The second actuation unit 22 is configured as bicycle control device that can be used as either a shift control device (shifter) for controlling a gear position of a gear changing device such as a derailleur or an internally geared hub (i.e., the bicycle component BC2), or a suspension control device for controlling compression damping and/or rebound damping of a bicycle suspension (i.e., the bicycle component BC2). However, the second actuation unit 22 can be configured as a bicycle control device for controlling other types of bicycle components as needed and/or desired.

As seen in FIGS. 1 to 4, the first actuation unit 20 includes a first base member 26, while the second actuation unit 22 includes a second base member 28. The first actuation unit 20 further comprises a first operating member 30, and the second actuation unit 22 further comprises a second operating member 32. The first operating member 30 is mounted to the first base member 26 to control the first bicycle component BC1. In the illustrated embodiment, the first operating member 30 is configured to operate an adjustable seatpost as the first bicycle component BC1. The second operating member 32 is mounted to the second base member 28 to control the second bicycle component BC2. In the illustrated embodiment, the second operating member 32 is configured to operate one of a shift device and a suspension as the second bicycle component BC2.

In the illustrated embodiment, the first operating member 30 is pivotally mounted to the first base member 26. Specifically, the first operating member 30 is pivotally mounted to the first base member 26 to pivot about a first axis A1 to control the first bicycle component BC1. Likewise, in the illustrated embodiment, the second operating member 32 is pivotally mounted to the second base member 28 to control a second bicycle component BC2. Specifically, the second operating member 32 is arranged to pivot about a second axis A2. Preferably, as in the illustrated embodiment, the first axis A1 and the second axis A2 are coaxially arranged with respect to each other.

As seen in FIGS. 1 to 3, 7 and 8, the bicycle component operating device 10 further comprises a first fixing member 34A for fixing the first base member 26 to the second base member 26. Here, in the illustrated embodiment, the first fixing member 34A is a threaded fastener (e.g., a fixing bolt). The first base member 26 includes a first hole 36, while the second base member 28 includes a second hole 38. The first fixing member 34A is disposed in the first hole 36. Likewise, in the illustrated embodiment, the first fixing member 34A is disposed in the second hole 38. Accordingly, the first hole 36 is positioned along the first axis A1, and the second hole 38 is also positioned along the first axis A1. The first hole 36 is a non-threaded hole. On the other hand, the second hole 38 is at least a partially threaded hole that is threadedly engaged with the first fixing member 34A.

The first fixing member 34A detachably attaches the first base member 26 to the second base member 28 such that the first actuation unit 20 and the mounting member 24 can be repeatedly connected to and disconnected from the second actuation unit 22 using the first fixing member 34A. Also, in the illustrated embodiment, the first fixing member 34A fixes the first base member 26 to the mounting member 24. In other words, the first fixing member 34A is configured to fix the first actuation unit 20 and the second actuation unit 22 to the mounting member 24 in a state where the first base member 26 and the second base member 28 are attached to each other along the axial direction. As a result, the first fixing member 34A is configured to fix the first base member 26 to the mounting member 24. The first fixing member 34A has an axial direction. The axial direction of the first fixing member 34A coincides with the first axis A1. Alternatively, instead of using the first fixing member 34A for fixing the first base member 26 to the mounting member 24, a separate fixing member can be provided.

Figure 12:
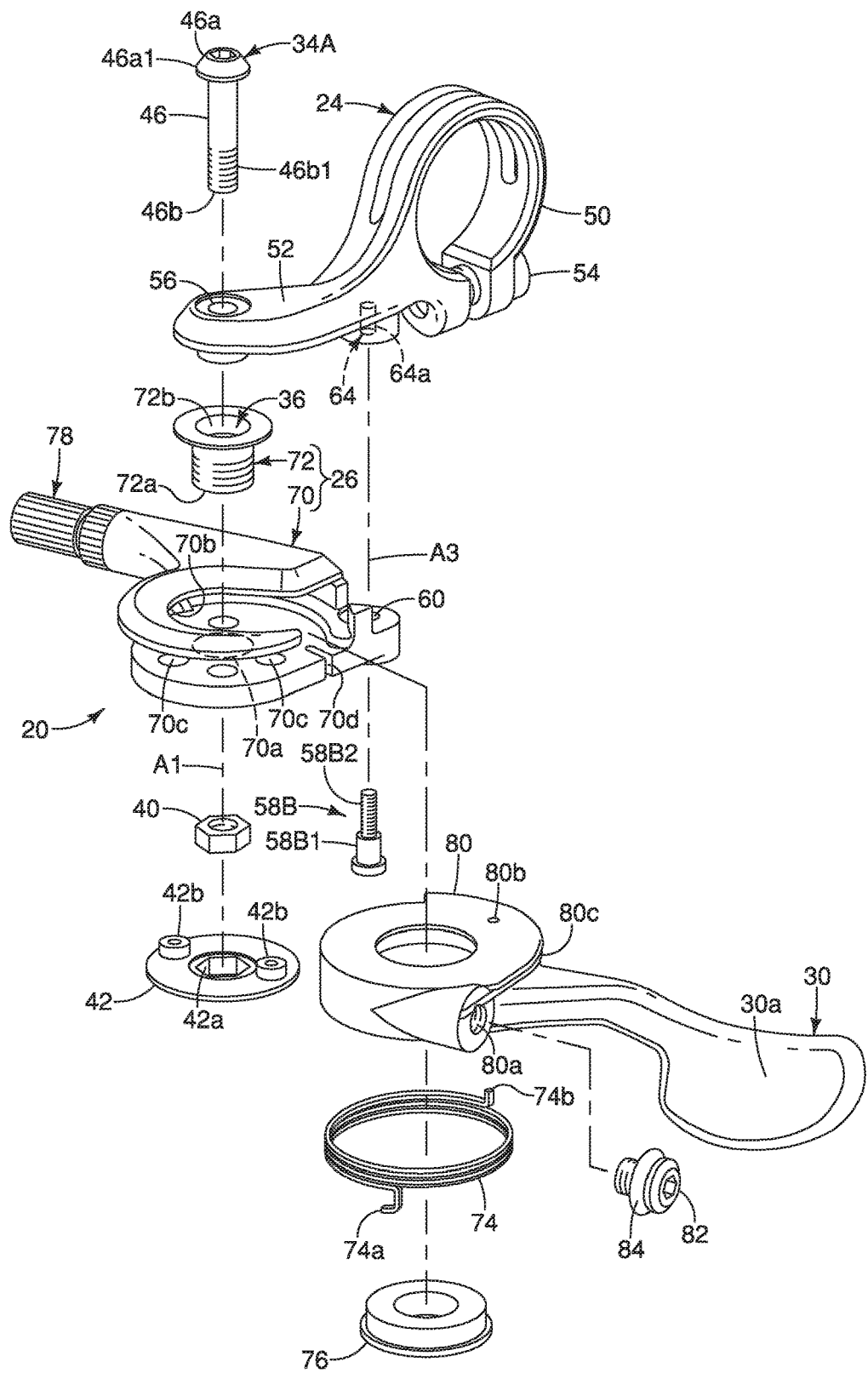
FIG. 12 is a top exploded perspective view of the first actuation unit illustrated in FIGS. 10 and 11 illustrating the parts used to form the bicycle component operating device including only the first actuation unit.

The first fixing member 34A is also used when only the first actuation unit 20 is fixed to the mounting member 24. In other words, the first fixing member 34A is also configured to fix the first actuation unit 20 to the mounting member 24 in a state where the first base member 26 is not attached to the second base member 28. In this case, the first fixing member 34A is provided with a nut 40 as seen in FIG. 12. A cover 42 is press fitted over the nut 40 to provide an attractive appearance and to prevent the nut 40 from inadvertently loosening. The cover 42 can be made from any suitable material such as a rigid plastic material or a metallic material. Here, the cover 42 has a center recess 42a that is shaped and sized to frictionally engage the nut 40. The cover 42 also has a pair of projections 42b that engage the first base member 26 to prevent rotational movement of the cover 42 relative to the first base member 26.

Figure 15:
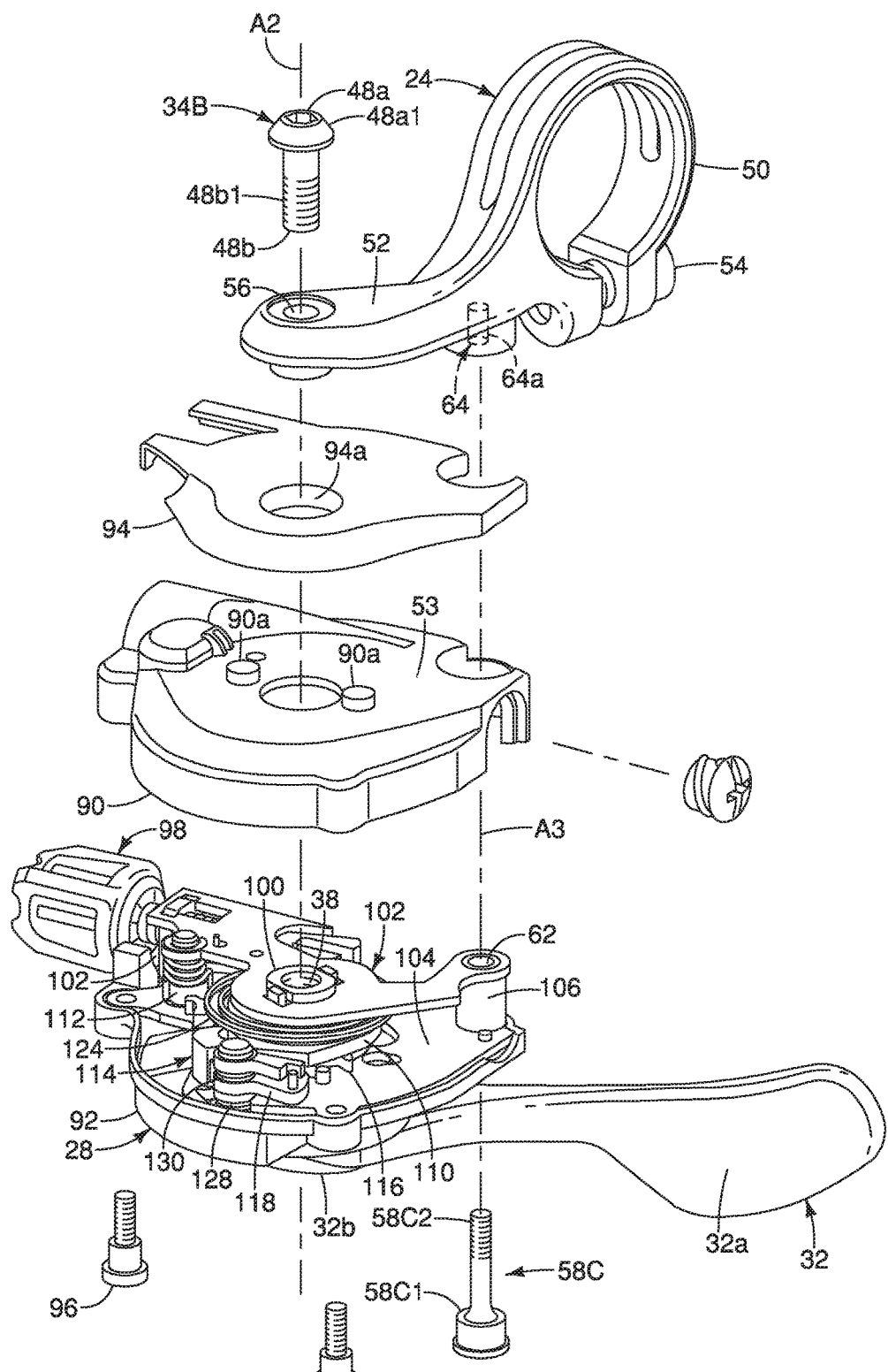
FIG. 15 is a partially exploded perspective view of the second actuation unit illustrated in FIGS. 13 and 14 illustrating the parts used to form the bicycle component operating device including only the second actuation unit.

On the other hand, as seen in FIGS. 13 to 15, the first fixing member 34A is not used when only the second actuation unit 22 is fixed to the mounting member 24. Rather, in this situation, the bicycle component operating device 10 further comprises a second fixing member 34B. The second fixing member 34B is configured to fix one of the first actuation unit 20 and the second actuation unit 22 to the mounting member 24 in a state where only the one of the first base member 26 and the second base member 28 is attached to the mounting member 24. In the illustrated embodiment, the second fixing member 34B is configured to fix the second actuation unit 22 to the mounting member 24 in a state where the second base member 28 is attached to the mounting member 24. In other words, the second fixing member 34B is used to fix the second actuation unit 22 to the mounting member 24 when the first actuation unit 20 is not coupled to the mounting member 24. Here, in the illustrated embodiment, the second fixing member 34B is a threaded fastener (e.g., a fixing bolt). The second fixing member 34B detachably attaches the mounting member 24 to the second base member 28 such that the second actuation unit 22 can be repeatedly connected to and disconnected from the mounting member 24 using the second fixing member 34B. With this configuration, the second fixing member 34B is shorter than the first fixing member 34A. Alternatively, instead of using the second fixing member 34B for fixing the second base member 28 to the mounting member 24, the second actuation unit 22 could be modified to be used with the first fixing member 34A. In such a modification, the bicycle component operating device 10 would not need to be provided with the second fixing member 34B.

Figure 8:
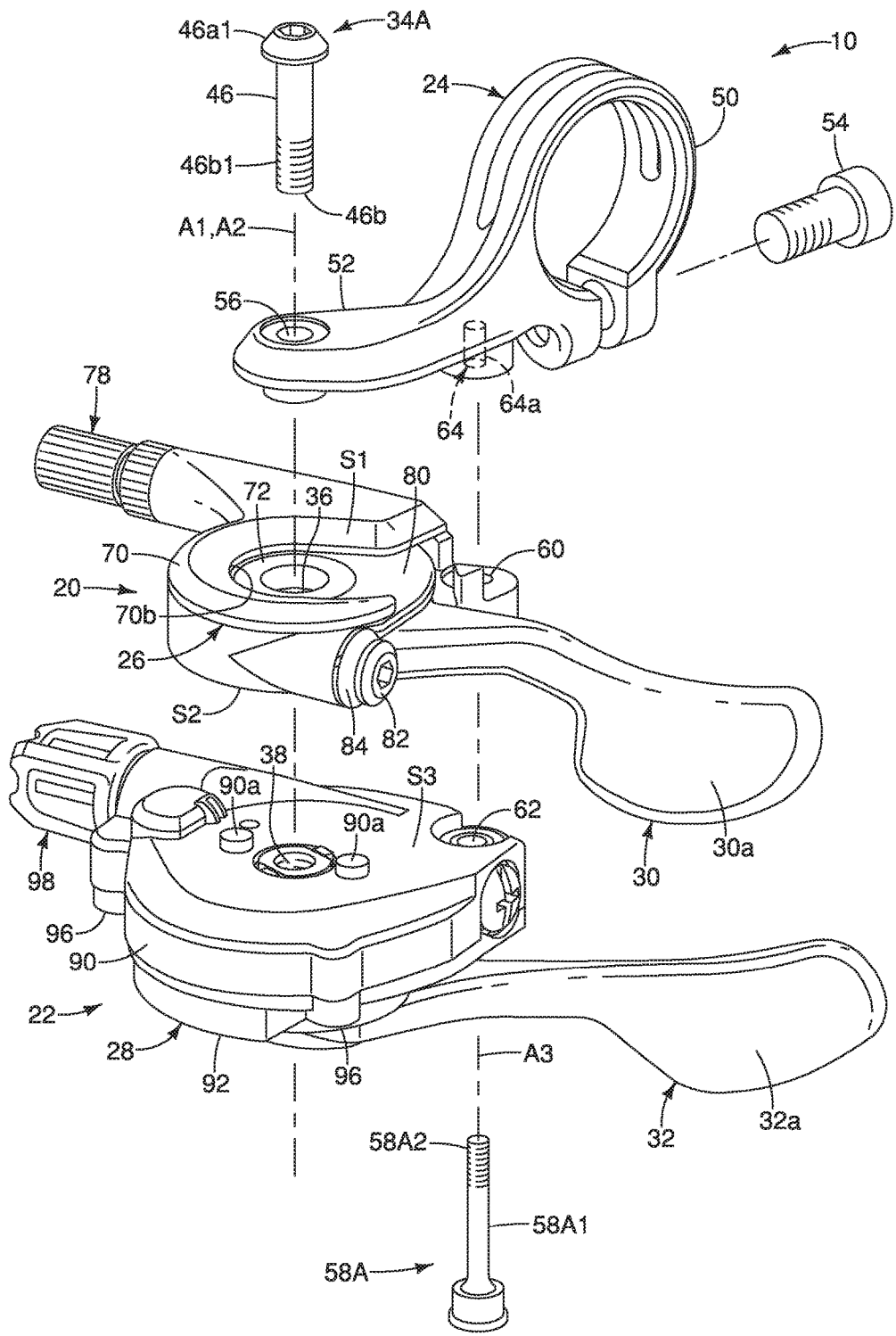
FIG. 8 is a partially exploded perspective view of the bicycle component operating device illustrated in FIGS. 1 to 7 illustrating the detachability of the first and second actuation units from each other as well as from the mounting member.
Figure 9:
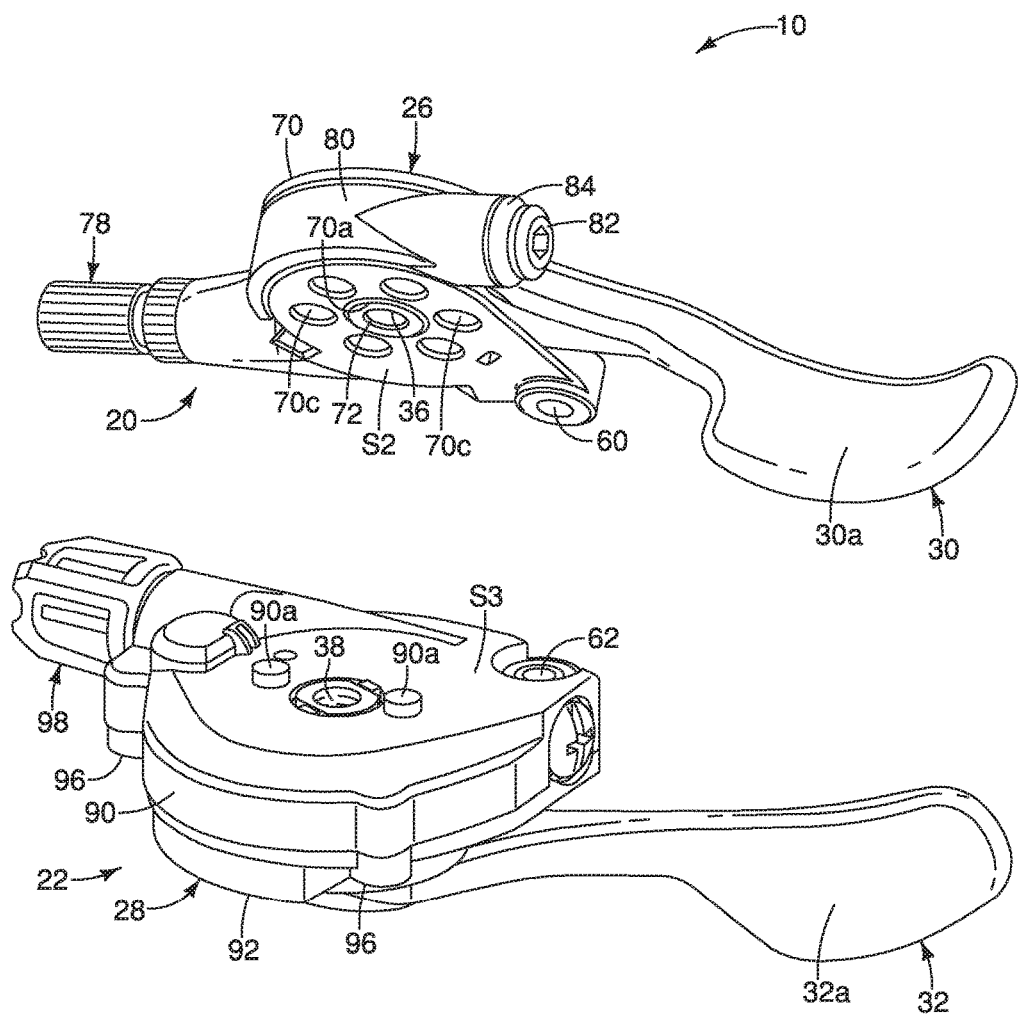
FIG. 9 is a partially exploded perspective view of the first and second actuation units illustrated in FIGS. 1 to 8 illustrating the mating attachment surfaces of the first and second actuation units.

As seen in FIGS. 8 and 12, the first fixing member 34A includes a shaft 46. The shaft 46 has a first end portion 46a and a second end portion 46b. The first fixing member 34A includes a head 46a1 that is disposed on the first end portion 46a. The shaft 46 has a first threaded portion 46b1 that is disposed along the second end portion 46b. Basically, the first fixing member 34A is a fixing bolt that threadedly engages the second base member 28 when both of the first and second actuation units 20 and 22 are attached to the mounting member 24. In particular, when both of the first and second actuation units 20 and 22 are attached to the mounting member 24, the second hole 38 of the second base member 28 has a second threaded portion 38a that is threadedly engaged with the first threaded portion 46b1 of the first fixing member 34A. When the first fixing member 34A is attached to the second base member 28, the first base member 26 is positioned between the head 46a1 of the first fixing member 34A and the second base member 28. On the other hand, the first fixing member 34A threadedly engages the nut 46 when only the first actuation unit 20 is attached to the mounting member 24.

As seen in FIG. 15, the second fixing member 34B includes a shaft 48. The shaft 48 has a first end portion 48a and a second end portion 48b. The second fixing member 34B includes a head 48a1 that is disposed on the first end portion 48a. The shaft 48 has a first threaded portion 48b1 that is disposed along the second end portion 48b. As explained below, the second fixing member 34B is a fixing bolt that threadedly engages the second base member 28 when only the second actuation unit 22 is attached to the mounting member 24. In particular, when only the second actuation unit 22 is attached to the mounting member 24, the second threaded portion 38a of the second hole 38 is threadedly engaged with the first threaded portion 48b1 of the second fixing member 34B.

Referring now to FIGS. 1 to 8, the mounting member 24 will now be discussed in more detail. In the illustrated embodiment, the mounting member 24 is a handlebar mounting member. The mounting member 24 includes a clamp portion 50, an attachment portion 52 and a tightening bolt 54. The clamp portion 50 is a conventional tube clamp that constitutes an example of a handlebar clamp. Here, the clamp portion 50 and the attachment portion 52 are made as a single member (one-piece). The clamp portion 50 and the attachment portion 52 are constructed of a hard rigid material such as a hard plastic or a lightweight metal.

The clamp portion 50 is in the form of a split ring. Alternatively, the clamp portion 50 of the mounting member 24 can be a two-piece hinge type of handlebar clamp that is used with the tightening bolt 54, or two separate pieces that are attached together by a pair of tightening bolts. The tightening bolt 54 is configured to squeeze the clamp portion 50 onto the handlebar H.

The attachment portion 52 of the mounting member 24 can be fixed to both of the first and second base members 26 and 28 using the first fixing member 34A or can be fixed only to one of the first and second base members 26 and 28 using one of the first and second fixing members 34A and 34B as mentioned above. The attachment portion 52 of the mounting member 24 includes a third hole 56. When either both of the first and second actuation units 20 and 22 are attached to the mounting member 24 or only the first actuation unit 20 is attached to the mounting member 24, the first fixing member 34A is disposed in the third hole 56.

In the illustrated embodiment, the bicycle component operating device 10 further comprises an additional fixing member 58A for further fixing the first base member 26 to the mounting member 24. Basically, the additional fixing member 58A is used when both of the first and second actuation units 20 and 22 are attached to the mounting member 24. In the illustrated embodiment, the bicycle component operating device 10 further comprises an additional fixing member 58B for further fixing the first base member 26 to the mounting member 24 when only the first actuation unit 20 is attached to the mounting member 24. In the illustrated embodiment, the bicycle component operating device 10 further comprises an additional fixing member 58C for further fixing the second base member 28 to the mounting member 24 when only the second actuation unit 22 is attached to the mounting member 24.

Each of the additional fixing members 58A, 58B and 58C is different from the first fixing member 34A. Each of the additional fixing members 58A, 58B and 58C is also different from the second fixing member 34B. The additional fixing member 58A can be also referred to as a third fixing member. The additional fixing member 58B can be also referred to as a fourth fixing member. The additional fixing member 58C can be also referred to as a fifth fixing member. The additional fixing member 58A includes a shaft 58A1. The shaft 58A1 has a third threaded portion 58A2. Similarly, the additional fixing member 58B includes a shaft 58B1, and the additional fixing member 58C includes a shaft 58C1. The shaft 58B1 has a third threaded portion 58B2, while the shaft 58C1 has a third threaded portion 58C2. To accommodate the additional fixing members 58A, 58B and 58C, the first base member 26 includes a fourth hole 60 that is different from the first hole 36. The second base member 28 includes a fifth hole 62 that is different from the second hole 38. The mounting member 24 includes a sixth hole 64 that is different from the third hole 56. When both of the first and second actuation units 20 and 22 are attached to the mounting member 24 by the first fixing member 34A, the fourth, fifth and sixth holes 60, 62 and 64 are coaxially aligned, and have a common center axis A3 that is parallel to the first axis A1. The additional fixing member 58A is disposed in each of the fourth hole, the fifth hole and the sixth hole, when both of the first and second actuation units 20 and 22 are attached to the mounting member 24 by the first fixing member 34A. The sixth hole 64 has a fourth threaded portion 64a that is threadedly engaged with the third threaded portion 58A2.

When only the first actuation unit 20 is attached to the mounting member 24 by the first fixing member 34A, the fourth and sixth holes 60 and 64 are coaxially aligned, and the third threaded portion 58B2 of the additional fixing member 58B is threadedly engaged with the fourth threaded portion 64a of the mounting member 24. On the other hand, when only the second actuation unit 22 is attached to the mounting member 24 by the second fixing member 34B, the fifth and sixth holes 62 and 64 are coaxially aligned, and the third threaded portion 58C2 of the additional fixing member 58C is threadedly engaged with the fourth threaded portion 64a of the mounting member 24.

Referring now to FIGS. 7 to 12, the first base member 26 will now be discussed in more detail. The first base member 26 includes a first attachment surface S1 and a second attachment surface S2 that is positioned at an opposite side from the first attachment surface S1 with respect to an axial direction that is parallel to the first axis A1. In the illustrated embodiment, the first base member 26 basically includes a first housing part 70 and a second housing part 72. The second housing part 72 defines the first hole 36 that receives the first fixing member 34A therethrough. The first hole 36 is a non-threaded bore.

Figure 7:
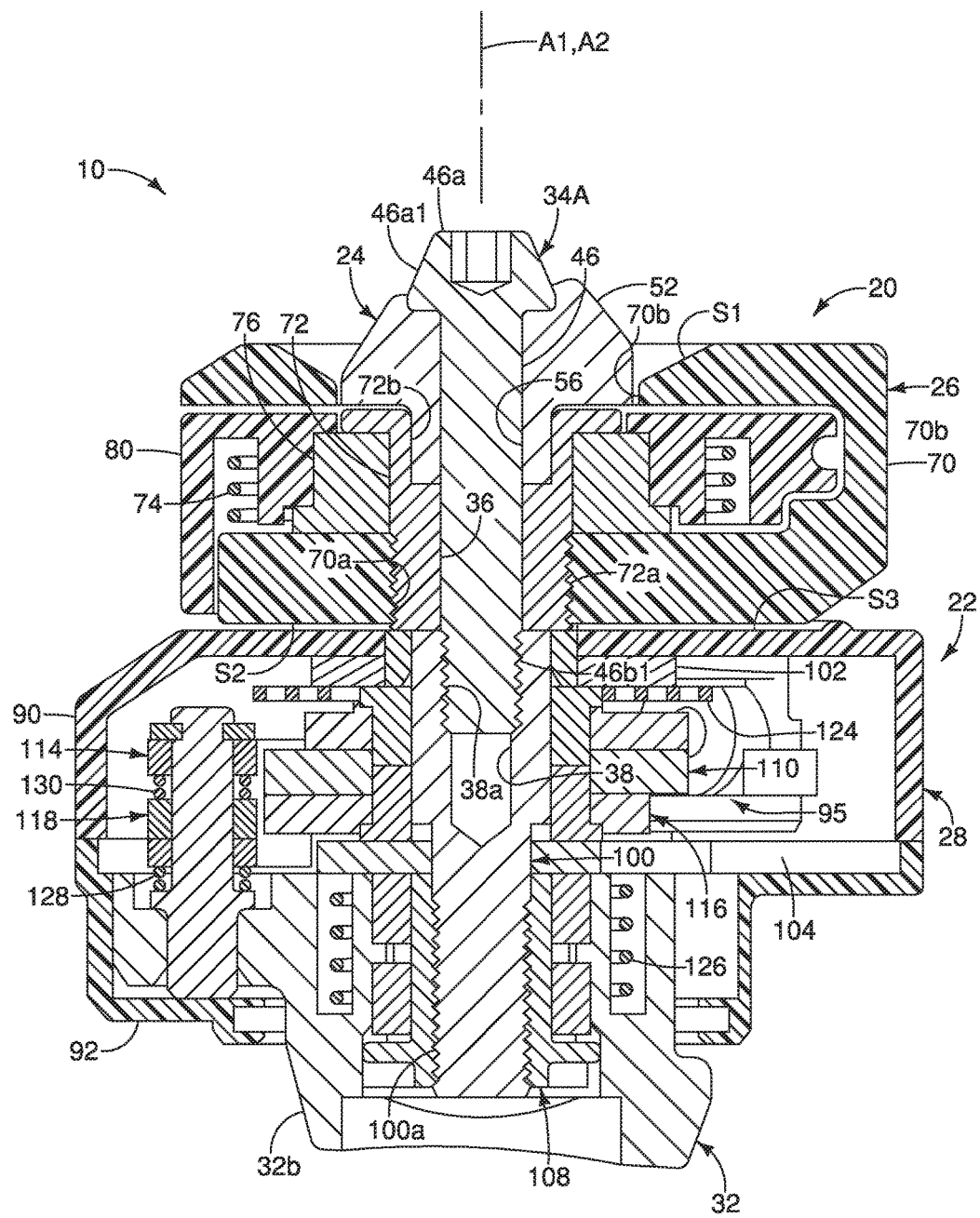
FIG. 7 is an enlarged cross sectional view of the bicycle component operating device illustrated in FIGS. 1 to 6 as seen along section line 7-7 of FIG. 2 but with selected internal parts removed to better illustrate the connection between the first and second actuation units.

The first and second housing parts 70 and 72 are hard rigid members constructed of a suitable material such as a hard plastic or a lightweight metal. The first and second housing parts 70 and 72 are detachably connected for assembling the various parts of the first actuation unit 20 as a self-contained unit from the second actuation unit 22. Here, as seen in FIG. 7, the second housing part 72 is fixedly coupled to the first housing part 70 by a threaded connection. In particular, the first housing part 70 has a threaded hole 70a that threadedly receives a threaded portion 72a of the second housing part 72. In this way, in the illustrated embodiment, the first and second housing parts 70 and 72 are configured such that the first operating member 30 remains with the first base member 26 upon separation of the first base member 26 from the second base member 28.

The first and second housing parts 70 and 72 define the first attachment surface S1, while the first housing part 70 defines the second attachment surface S2. The first attachment surface S1 is configured to be attached to the mounting member 24. Here, as seen in FIG. 7, the first housing part 70 has an opening 70b that receives a part of the attachment portion 52 of the mounting member 24, and the second housing part 72 has a counterbore 72b that receives a part of the attachment portion 52 of the mounting member 24. The second attachment surface S2 has a first surface profile. Specifically, here, the second attachment surface S2 of the first housing part 70 includes a pair of recesses or holes 70c as defining the first surface profile. The holes 70c (i.e., the first surface profile) are configured to engage the second base member 28 when the first and second actuation units 20 and 22 are coupled together as discussed below. When the first actuation unit 20 is used independently of the second actuation unit 22, the projections 42b of the cover 42 are received in the holes 70c. As a result of the engagement of the projections 42b with the holes 70c, the cover 42 is prevented from rotating movement of the relative to the first base member 26, and thus, prevent the nut 40 from inadvertently loosening.

The first actuation unit 20 further includes a biasing element 74 that is operatively coupled between the first operating member 30 and the first housing part 70 to bias the first operating member 30 towards a rest position. The term "rest position" as used herein refers to a state in which the part (e.g., the first operating member 30) remains stationary without the need of a user holding the part in that state corresponding to the rest position. In the illustrated embodiment, the biasing element 74 is a torsion spring that is coiled around the second housing part 72. A first free end 74a of the biasing element 74 is operatively coupled to the first housing part 70, while a second free end 74b of the biasing element 74 is operatively coupled to the first operating member 30. In this way, when the first operating member 30 is released after being moved from the rest position to the operated position, the first operating member 30 automatically returns to the rest position once the second operating member 32 is released by the user. A bushing 76 is provided on the second housing part 72 to fill the gap between the second housing part 72 and the biasing element 74.

The first actuation unit 20 further includes a cable adjuster 78 for adjusting tension of the inner wire 14b by varying a contact point of an end of the outer case 12a relative to the first base member 26. In other words, the cable adjuster 78 allows a user to adjust the tension of the inner wire 14b to a desired tension level. The cable adjuster 78 includes a barrel bolt that is threadedly connected to the first housing part 70, and a locking ring that is threaded on the barrel bolt for establishing the desired position of the barrel bolt by preventing the barrel bolt from inadvertently turning. Since cable adjusters such as the cable adjuster 78 are well known, the cable adjuster 78 will not be discussed and/or illustrated in detail herein.

The first actuation unit 20 further includes a first rotatable member 80. Here, in the illustrated embodiment, the first rotatable member 80 is integrally formed with the first operating member 30. In the illustrated embodiment, the first operating member 30 and the first rotatable member 80 are a single member formed of a suitable rigid material. An inner wire fixing bolt 82 is threaded into a hole 80a of the first rotatable member 80 for fixedly attaching the inner wire 14b to the first rotatable member 80. Preferably, a washer 84 is provided on the inner wire fixing bolt 82 to aid in fixing the inner wire 14b to the first rotatable member 80. As a result, the first rotatable member 80 is rotatably mounted to the first base member 26 about the first axis A1 to control the first bicycle component BC1 Also, the first rotatable member 80 remains with the first base member 26 upon separation of the first base member 26 from the second base member 28.

The first free end 74a of the biasing element 74 is disposed in a slot 70d of the first housing part 70, while the second free end 74b of the biasing element 74 is disposed in a hole 80b of the first rotatable member 80. In this way, the biasing element 74 biases the first operating member 30 and the first rotatable member 80 toward the rest position. When the first operating member 30 and the first rotatable member 80 are rotated towards the operated position (FIG. 5), the inner wire 14b is pulled towards the first housing part 70. Here, the first rotatable member 80 has a groove 80c on its peripheral surface for receiving a portion of the inner wire 14b. In the illustrated embodiment, the first base member 26 is free of a positioning ratchet. In other words, the first actuation unit 20 is free of a positioning structure such as a positioning ratchet that would hold the inner wire 14b at a different position other than the rest position with respect to the first housing part 70 of the first base member 26 without the need of a user holding a part to obtain that different position. Thus, when the first operating member 30 is pivoted from the rest position and then released, the inner wire 14b always returns to the same position with respect to the first housing part 70 of the first base member 26. In contrast, if a positioning structure such as a positioning ratchet were included in the first actuation unit 20, which it is not, then the positioning structure would hold the inner wire 14b at a different position other than the rest position with respect to the first housing part 70 of the first base member 26 without the need of a user holding a part to obtain that different position.

Referring now to FIGS. 7 and 13 to 16, the second base member 28 will now be discussed in more detail. Clearly, as seen in FIG. 7, the second base member 28 is different from the first base member 26. The second base member 28 is configured to be separably attached to the first base member 26 along the axial direction. In other words, the second base member 28 is separably attached to the first base member 26 along an axial direction parallel to the first axis A1 by the first fixing member 34A. With this arrangement, the second base member 28 is separably attached to the first base member 26 opposite to the mounting member 24 along the axial direction.

As seen in FIG. 7, the second base member 28 includes a third attachment surface S3 that is configured to be attached to the second attachment surface S2. In the illustrated embodiment, the second base member 28 basically includes a first housing part 90 and a second housing part 92. The first housing part 90 defines the third attachment surface S3. As seen in FIG. 15, the third attachment surface S3 has a second surface profile. Here, the first housing part 90 includes the third attachment surface S3. The first housing part 90 includes a pair of projections 90a. The projections 90a defines the second surface profile in the illustrated embodiment. The first surface profile (e.g., the holes 70c) and the second surface profile (e.g., the projections 90a) are configured such that the first base member 26 and the second base member 28 are supported on each other in a state where the first base member 26 and the second base member 28 are attached to each other along the axial direction. Alternatively, the first and second surface profiles can have other configurations such that the first and second surface profiles are compatible with other. Preferably, the first and second surface profiles are configured to prevent relative rotational movement about the first axis A1.

As seen in FIGS. 13 and 15, when the second actuation unit 22 is used independently of the first actuation unit 20, the second actuation unit 22 further includes a top cover 94 that is press fitted to the projections 90a of the second attachment surface S2 of the first housing part 90. Alternatively, the top cover 94 can be omitted. The top cover 94 has an opening 94a such that the second fixing member 34B can be attached to the second base member 28 for attaching the mounting member 24 to the second actuation unit 22. The attachment of the mounting member 24 to the second actuation unit 22 also secures the top cover 94 to the first housing part 90.

Figure 16:
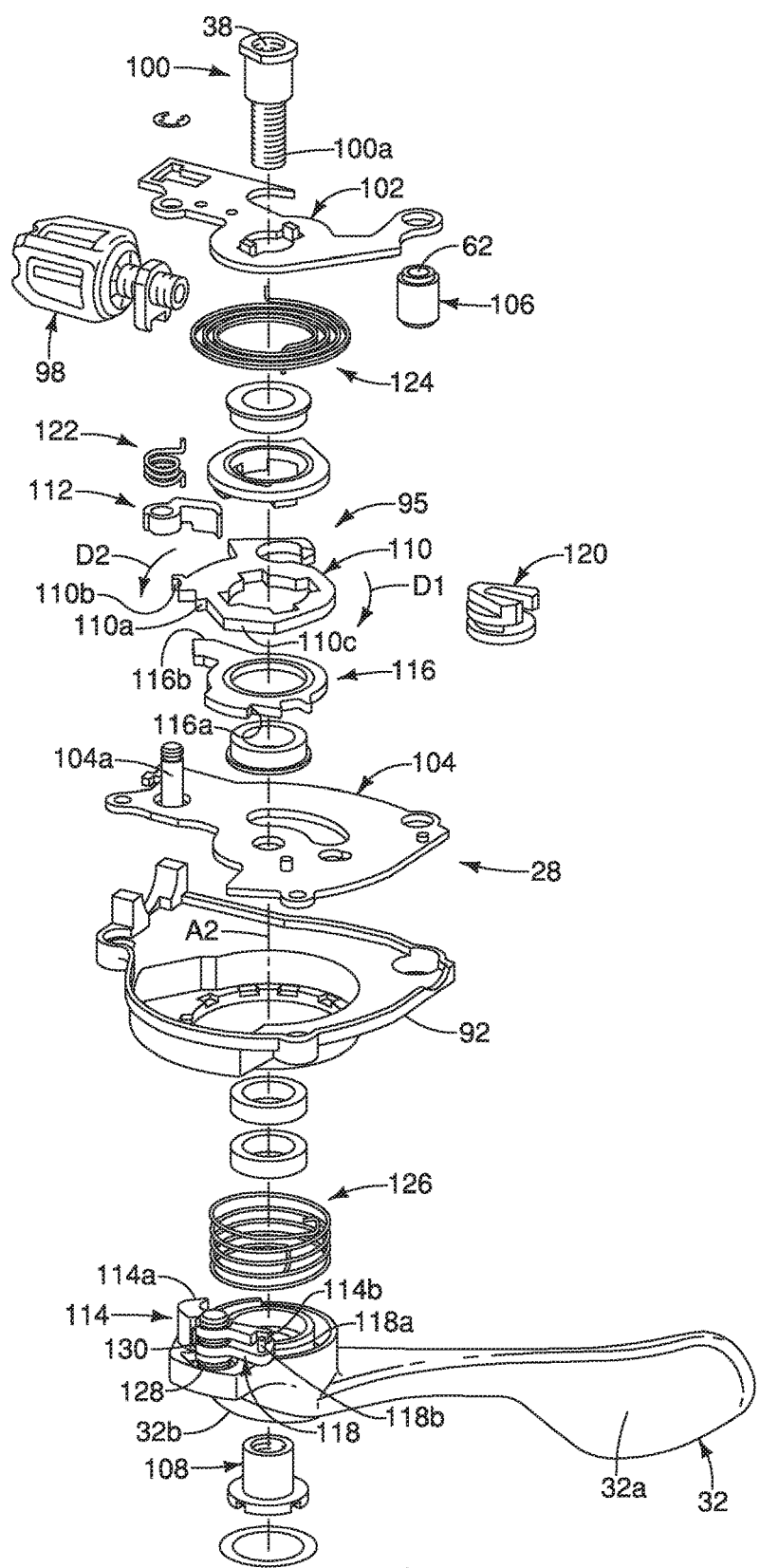
FIG. 16 is a partially exploded perspective view of selected parts of the second actuation unit illustrated in FIGS. 13 to 15 illustrating the parts used to form the bicycle component operating device including only the second actuation unit.

As seen in FIGS. 13 to 16, the first and second housing parts 90 and 92 are hard rigid members constructed of a suitable material such as a hard plastic or a lightweight metal. As seen in FIGS. 15 and 16, the first and second housing parts 90 and 92 form a hollow main body that houses a cable positioning unit 95 (i.e., a position maintaining mechanism) of the second actuation unit 22. The first and second housing parts 90 and 92 are detachably connected by a pair of fasteners 96 (e.g., screws). When the second actuation unit 22 is used independently of the first actuation unit 20, the mounting member 24 is attached to the second actuation unit 22 using the second fixing member 34B and the additional fixing member 58C.

The second actuation unit 22 further includes a cable adjuster 98 for adjusting tension of the inner wire 14b by varying a contact point of an end of the outer case 14a relative to the second base member 28. In other words, the cable adjuster 98 allows a user to adjust the tension of the inner wire 14h to a desired tension level. The cable adjuster 98 includes a barrel bolt that is threadedly connected to the first housing part 90, and an adjusting knob that is disposed on the barrel bolt for turning the barrel bolt to a desired position. The cable adjuster 98 further includes a compression spring (not shown) disposed on the barrel bolt for pressing the adjusting knob against abutments of the first and second housing parts 90 and 92 to preventing the barrel bolt from inadvertently turning. Since cable adjusters such as the cable adjuster 98 are well known, the cable adjuster 98 will not be discussed and/or illustrated in detail herein.

As seen in FIGS. 7, 15 and 16, in the illustrated embodiment, the second base member 28 further comprises an internal support structure that includes a main axle 100, a first or upper support 102, a second or lower support 104 and a support sleeve 106. The main axle 100 defines the second axis A2, and includes the second hole 38 that is at least a partially threaded hole that is threadedly engaged one at a time with the first fixing member 34A and the second fixing member 34B. The support sleeve 106 defines the fifth hole 62 that receives the additional fixing member 58A when the first and second actuation units 20 and 22 are attached together, and that receives the additional fixing member 58B when the second actuation unit 22 is used independently of the first actuation unit 20.

Here, the main axle 100 is a mounting bolt that has a fixing nut 108 screwed onto an externally threaded shaft portion 100a of the main axle 100 for pivotally supporting the second operating member 32 to the second base member 28. In this way, the second operating member 32 remains with the second base member 28 upon separation of the first base member 26 from the second base member 28.

In the illustrated embodiment, for example, the first and second supports 102 and 104 are rigid plate members that are constructed from metal plates. The first and second supports 102 and 104 are interconnected to form an internal frame or support structure that together with the main axle 100 supports the cable positioning unit 95.

Referring now to FIGS. 15 and 16, the cable positioning unit 95 will now be briefly discussed. While one example of a positioning unit is illustrated, the second actuation unit 22 of the bicycle component operating device 10 can be provided with other positioning units. For example, while the cable positioning unit 95 has only two predetermined cable maintaining positions, the second actuation unit 22 can be provided with a cable positioning unit having more than two predetermined cable maintaining positions. Also, while the cable positioning unit 95 is operated by a single operating lever (the second operating member 32), the second actuation unit 22 can be provided with a cable positioning unit having two operating levers or members.

In the illustrated embodiment, the cable positioning unit 95 basically includes a positioning ratchet 110. In other words, the bicycle component operating device 10 further comprises the positioning ratchet 110 that is pivotally mounted with respect to the second base member 28 about the second axis A2. The cable positioning unit 95 further includes a positioning pawl 112, a pulling pawl 114, a release member 116 and a releasing pawl 118. The positioning ratchet 110 includes an inner wire connection structure 120 for attaching the inner wire 14b to the positioning ratchet 110. With this structure, the cable positioning unit 95 release from the inner wire 14b to feed out of the first and second housing parts 90 and 92 and pull the inner wire 14b into the first and second housing parts 90 and 92. In the illustrated embodiment, the positioning ratchet 110 corresponds to a second rotatable member. In this way, the second actuation unit 22 includes a second rotatable member. The second rotatable member (e.g., the positioning ratchet 110 in the illustrated embodiment) is rotatably mounted to the second base member 28 about a second axis A2 to control the second bicycle component BC2. The second rotatable member (e.g., the positioning ratchet 110 in the illustrated embodiment) remains with the second base member 28 upon separation of the first base member 26 from the second base member 28.

Figure 6:
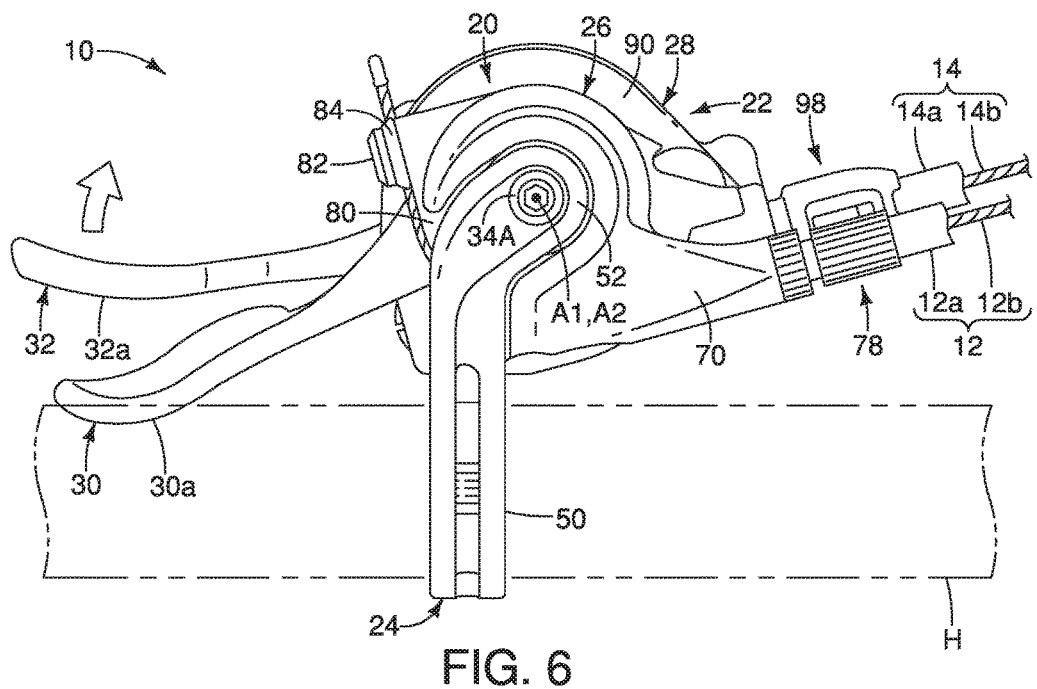
FIG. 6 is a top plan view of the bicycle component operating device illustrated in FIGS. 1 to 5, but with the second operating member moved to an operated position and the first operating member in the rest position.

Basically, the positioning ratchet 110 and the positioning pawl 112 cooperate to hold the inner wire 14b at one of two predetermined positions with respect to the second base member 28. The positioning ratchet 110 selectively rotates a first direction D1 and a second direction D2 (see FIG. 16). More specifically, the positioning ratchet 110 is rotatably mounted with respect to the second base member 28 about the second axis A2 between a first position and a second position. The first position of the positioning ratchet 110 corresponds to a fully released position. The second position of the positioning ratchet 110 corresponds to a fully wound position. The positioning ratchet 110 is moved between the first and second directions D1 and D2 in response to a user operating the second operating member 32 from a rest position (FIGS. 2, 13 and 14) to an operated position (FIG. 6).

The positioning pawl 112 is movably mounted with respect to the second base member 28 between a holding position and a releasing position. A biasing element 122 (a torsion spring) is provided for biasing the positioning pawl 112 towards engagement with the positioning ratchet 110. The positioning pawl 112 prevents rotation of the positioning ratchet 110 in the second direction D2 about the second axis A2 while the positioning pawl 112 is in the holding position. The positioning pawl 112 releases the positioning ratchet 110 for rotation in the second direction D2 while the positioning pawl 112 is in the releasing position.

Preferably, the cable positioning unit 95 further comprises a biasing element 124 (see FIG. 16) that biases the positioning ratchet 110 towards the fully released position. In other words, the biasing element 124 (e.g., a flat torsion spring) biases the positioning ratchet 110 towards the second direction D2 about the second axis A2. The second direction D2 corresponds to a wire releasing direction in which the inner wire 14b is payed out of the first and second housing parts 90 and 92. When the positioning pawl 112 is disengaged from the positioning ratchet 110 during a releasing operation, the positioning ratchet 110 rotates in the second direction D2 about the second axis A2.

Preferably, the second operating member 32 is an operating lever that has a user operating portion 32a and a mounting portion 32b. As mentioned above, the second operating member 32 is mounted to the second base member 28 by the main axle 100. Thus, the second operating member 32 is pivotally mounted with respect to the second base member 28 from a rest position toward an operated position. Preferably, the second operating member 32 is biased towards the rest position such that the second operating member 32 is a trigger lever. In the illustrated embodiment, a biasing element 126 (a torsion spring) is provided for biasing the second operating member 32 towards the rest position. In this way, when the second operating member 32 is released after being moved from the rest position to the operated position, the second operating member 32 automatically returns to the rest position once the second operating member 32 is released by the user.

In the illustrated embodiment, the pulling pawl 114 and the releasing pawl 118 are movably mounted on the second operating member 32 to move therewith. In this way, the second operating member 32 is used for both pulling the inner wire 14b by rotating the positioning ratchet 110 in the first direction D1 and releasing the inner wire 114b by rotating the positioning ratchet 110 in the second direction D2. In other words, when the second operating member 32 is moved from the rest position towards the operated position, the positioning ratchet 110 is moved between the first and second positions.

The pulling pawl 114 is biased towards engagement with the positioning ratchet 110. In the illustrated embodiment, a biasing element 128 (a torsion spring) is provided for biasing the pulling pawl 114 towards engagement with the positioning ratchet 110. The pulling pawl 114 rotates the positioning ratchet 110 in the first direction D1 about the second axis A2 in response to a pulling operation of the second operating member 32 from the rest position toward the operated position while the positioning ratchet 110 is in the first position.

The releasing pawl 118 rotates the release member 116 in the first direction D1 about the second axis A2 in response to the releasing operation of the second operating member 32 in the first direction D1 when the positioning ratchet 110 is in the second position. As explained below, the releasing pawl 118 moves the release member 116 in response to a releasing operation of the second operating member 32 from the rest position toward the operated position while the positioning ratchet 110 is in the second position. The release member 116 moves the positioning pawl 112 from the holding position to the releasing position in response to the releasing operation.

In the illustrated embodiment, the positioning ratchet 110 is a plate that is rotatably mounted about the second axis A2. The positioning ratchet 110 prevents the releasing pawl 118 from rotating the release member 116 while the positioning ratchet 110 is in the first position. Thus, the release member 116 remains stationary with respect to the second base member 28 during a pulling operation. In the illustrated embodiment, the positioning ratchet 110 includes at least one pulling abutment 110a that is engaged by the pulling pawl 114 during a pulling operation in which the second operating member 32 and the positioning ratchet 110 are moved together in the first direction D1. In this way, the pulling pawl 114 rotates the positioning ratchet 110 during a pulling operation. However, the pulling pawl 114 does not rotate the release member 116 during a pulling operation.

Moreover, the positioning ratchet 110 prevents the pulling pawl 114 from rotating the positioning ratchet 110 while the positioning ratchet 110 is in the second position. In the illustrated embodiment, the positioning ratchet 110 includes at least one positioning abutment 110b that is engaged by the positioning pawl 112 while the second operating member 32 is in the rest position and the positioning ratchet 110 is in the second position. In the illustrated embodiment, the positioning ratchet 110 includes a cam surface 110c that holds the releasing pawl 118 out of engagement with the release member 116 and the positioning ratchet 110 while the second operating member 32 is in the rest position and the positioning ratchet 110 is in the first position. The cam surface 110c holds the pulling pawl 114 out of engagement with the release member 116 and the positioning ratchet 110 while the second operating member 32 is in the rest position and the positioning ratchet 110 is in the second position.

The pulling pawl 114 includes a pulling tooth 114a that engages the pulling abutment 110a of the positioning ratchet 110 during a pulling operation while the positioning ratchet 110 is in the first position. The pulling pawl 114 includes a cam surface 114b that holds the releasing pawl 118 out of engagement with the release member 116 while the second operating member 32 is in the rest position and the positioning ratchet 110 is in the first position. In this way, the releasing pawl 118 does not rotate the release member 116 during a pulling operation. Thus, the pulling pawl 114 can pivot with respect to the releasing pawl 118.

The release member 116 is a plate that is rotatably mounted about the second axis A2. Specifically, the release member 116 is rotatably mounted on the main axle 100. The release member 116 is biased in the second direction D2 with respect to the second axis A2. In particular, the positioning pawl 112 is biased into contact with the release member 116 by the biasing element 122. This biasing force of the biasing element 122 biases the release member 116 in the second direction D2 with respect to the second axis A2 against a stop pin or abutment 104a that is provided on the second support 104.

In the illustrated embodiment, the release member 116 includes an abutment 116a that is engaged by the releasing pawl 118 as the second operating member 32 moves from the rest position towards the operated position while the positioning ratchet 110 is in the second position. In other words, the releasing pawl 118 rotates the release member 116 in the first direction D1 with respect to the second axis A2 as the second operating member 32 moves from the rest position towards the operated position while the positioning ratchet 110 is in the second position.

In the illustrated embodiment, the release member 116 includes a cam surface 116b that moves the positioning pawl 112 from the holding position to the releasing position as the second operating member 32 moves from the rest position toward the operated position while the positioning ratchet 110 is in the second position. In particular, the positioning pawl 112 is biased into contact with the cam surface 116b of the release member 116 by the biasing element 122. As a result, movement of the release member 116 will pivot the positioning pawl 112 from the holding position to the releasing position as the second operating member 32. As a result of the releasing position of the positioning pawl 112, the positioning ratchet 110 will be rotated in the second direction D2 about the second axis A2 until the first position by the biasing element 124.

The releasing pawl 118 is pivotally mounted on the second operating member 32 about the pawl pivot axis P2. The releasing pawl 118 includes a releasing tooth 118a and a pin or abutment 118b. The releasing pawl 118 is biased towards the engagement with the release member 116. In other words, the releasing tooth 118a of the releasing pawl 118 is biased towards the engagement with the abutment 116a of the release member 116. In the illustrated embodiment, a biasing element 130 (a torsion spring) is provided for biasing the releasing pawl 118 towards engagement with the release member 116. The releasing pawl 118 is disposed in outside a rotational path of the release member 116 while the second operating member 32 is in the rest position and the positioning ratchet 110 is in the first position. On the other hand, the releasing pawl 118 is disposed in a rotational path of the release member 116 while the second operating member 32 is in the rest position and the positioning ratchet 110 is in the second position. In particular, the abutment 118b is biased into contact with the cam surface 114b that holds the releasing pawl 118 out of engagement with the release member 116 while the second operating member 32 is in the rest position and the positioning ratchet 110 is in the first position. In this way, the releasing pawl 118 does not rotate the release member 116 during a pulling operation. However, while the positioning ratchet 110 is in the second position, the pulling tooth 114a of the pulling pawl 114 is pivoted away from the second axis A2 by the cam surface 110c of the positioning ratchet 110, and the cam surface 114b of the pulling pawl 114 is pivoted towards the second axis A2. As a result, the releasing pawl 118 moves towards the second axis A2 while the positioning ratchet 110 is in the second position. In this way, the positioning ratchet 110 prevents the pulling pawl 114 from rotating the positioning ratchet 110 and the releasing pawl 118 can rotate the release member 116 during a releasing operation. During a releasing operation, the releasing pawl 118 rotates the release member 116. However, the releasing pawl 118 does not rotate the positioning ratchet 110 during a releasing operation. In this way, the pulling pawl 114 does not rotate the release member 116 during a releasing operation.

As mentioned, the bicycle component operating device 10 can be provided as a kit that allows to a user to converter the bicycle component operating device 10 between the three different modes of use. While the bicycle component operating device 10 is illustrated as having a pair of actuation units for operating bicycle components using control cables, the bicycle component operating device 10 can be configured to operate non-cable operated units. In one simplistic configuration, the bicycle component operating device 10 basically comprises the mounting member 24, the first base member 26, the second base member 28, the first operating member 30, the second operating member 32, and the first fixing member 34A. In another simplistic configuration, the bicycle component operating device 10 basically comprises the first base member 26, the first operating member 30, the second base member 28 and the second operating member 32.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle component operating device. Accordingly, these directional terms, as utilized to describe the bicycle component operating device should be interpreted relative to a bicycle in an upright riding position on a horizontal surface and that is equipped with the bicycle component operating device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component operating device comprising:
   a first base member;
   a first operating member pivotally mounted to the first base member to pivot about a first axis to control a first bicycle component;
   a second base member being different from the first base member, the second base member being separably attached to the first base member such that the first base member and the second base member are stacked on each other in an axial direction parallel to the first axis; and
   a second operating member pivotally mounted to the second base member to control a second bicycle component that is different from the first bicycle component; and
   wherein the first operating member remains with the first base member and the second operating member remains with the second base member upon separation of the first base member from the second base member.

2. The bicycle component operating device according to claim 1, wherein
   the second operating member is arranged to pivot about a second axis; and
   the first axis and the second axis are coaxially arranged with respect to each other.

3. The bicycle component operating device according to claim 2, further comprising:
   a fixing member fixing the first base member to the second base member.

4. The bicycle component operating device according to claim 3, further comprising:
   a mounting member configured to be mounted to a bicycle handlebar, the fixing member fixing the first base member to the mounting member.

5. The bicycle component operating device according to claim 4, wherein
   the mounting member includes a third hole; and
   the fixing member is disposed in the third hole.

6. The bicycle component operating device according to claim 5, further comprising:
   an additional fixing member fixing the first base member to the mounting member, the additional fixing member that is different from the fixing member.

7. The bicycle component operating device according to claim 6, wherein
   the first base member includes a fourth hole that is different from the first hole;
   the second base member includes a fifth hole that is different from the second hole;
   the mounting member includes a sixth hole that is different from the third hole; and
   the additional fixing member is disposed in each of the fourth hole, the fifth hole and the sixth hole.

8. The bicycle component operating device according to claim 7, wherein
   the additional fixing member includes a shaft;
   the shaft has a third threaded portion; and
   the sixth hole has a fourth threaded portion that is threadedly engaged with the third threaded portion.

9. The bicycle component operating device according to claim 3, wherein
   the first base member includes a first hole;
   the second base member includes a second hole; and
   the fixing member is disposed in the first hole and the second hole.

10. The bicycle component operating device according to claim 9, wherein
the first hole and the second hole are positioned along the first axis.

11. The bicycle component operating device according to claim 9, wherein
the fixing member includes a shaft having a first threaded portion; and
the second hole has a second threaded portion that is threadedly engaged with the first threaded portion.

12. The bicycle component operating device according to claim 11, wherein
the shaft has a first end portion and a second end portion;
the first threaded portion is disposed along the second end portion;
the fixing member includes a head disposed on the first end portion; and
the first base member is positioned between the head of the fixing member and the second base member.

13. The bicycle component operating device according to claim 12, wherein
the first hole is a non-threaded hole.

14. The bicycle component operating device according to claim 1, further comprising:
a positioning ratchet pivotally mounted with respect to the second base member about the second axis.

15. The bicycle component operating device according to claim 14, wherein
the first base member is free of a positioning ratchet.

16. The bicycle component operating device according to claim 14, wherein
the first operating member is configured to operate an adjustable seatpost as the first bicycle component; and
the second operating member is configured to operate one of a shift device and a suspension as the second bicycle component.

17. A bicycle component operating device comprising:
a first actuation unit including a first base member and a first rotatable member rotatably mounted to the first base member about a first axis to control a first bicycle component; and
a second actuation unit including a second base member and a second rotatable member rotatably mounted to the second base member about a second axis to control a second bicycle component that is different from the first bicycle component;
the second base member being different from the first base member, the second base member being separably attached to the first base member such that the first base member and the second base member are stacked on each other in an axial direction parallel to the first axis; and
wherein the first rotatable member remains with the first base member and the second rotatable member remains with the second base member upon separation of the first base member from the second base member.

18. A bicycle component operating device comprising:
a mounting member configured to be mounted to a bicycle handlebar;
a first base member;
a first operating member mounted to the first base member to control a first bicycle component;
a fixing member configured to fix the first base member to the mounting member, the fixing member having an axial direction;
a second base member being different from the first base member, the second base member being separably attached to the first base member opposite to the mounting member in the axial direction such that the first base member and the second base member are stacked on each other in the axial direction; and
a second operating member mounted to the second base member to control a second bicycle component that is different from the first bicycle component; and
wherein the first operating member remains with the first base member and the second operating member remains with the second base member upon separation of the first base member from the second base member.

19. A bicycle component operating device comprising:
a mounting member configured to be mounted to a bicycle handlebar, and
a first actuation unit comprising:
a first base member; and
a first operating member pivotally mounted to the first base member about a first axis to control a first bicycle component;
the first base member including a first attachment surface and a second attachment surface that is positioned at an opposite side from the first attachment surface with respect to an axial direction that is parallel to the first axis, the first attachment surface being configured to be attached to the mounting member; and
a second actuation unit comprising:
a second base member being different from the first base member, the second base member being configured to be separably attached to the first base member along the axial direction; and
a second operating member pivotally mounted to the second base member to control a second bicycle component, the second bicycle component being different from the first bicycle component,
the second base member including a third attachment surface that is configured to be attached to the second attachment surface;
the second attachment surface having a first surface profile, the third attachment surface having a second surface profile, the first surface profile and the second surface profile being configured such that the first base member and the second base member are supported on each other in a state where the first base member and the second base member are attached to each other along the axial direction; and
wherein the first operating member remains with the first base member and the second operating member remains with the second base member upon separation of the first base member from the second base member.

20. The bicycle component operating device according to claim 19, further comprising:
one of a first fixing member and a second fixing member,
the first fixing member being configured to fix the first actuation unit and the second actuation unit to the mounting member in a state where the first base member and the second base member are attached to each other along the axial direction, and
the second fixing member being configured to fix one of the first actuation unit and the second actuation unit to the mounting member in a state where only the one of the first base member and the second base member is attached to the mounting member.

21. The bicycle component operating device according to claim 20, wherein
   the second fixing member is configured to fix the second actuation unit to the mounting member in a state where the second base member is attached to the mounting member; and
   the second fixing member is shorter than the first fixing member.

\* \* \* \* \*